Aug. 12, 1952    H. WENDE    2,606,352
FASTENING DEVICE FOR GARMENTS, SHOES, TENTS, AND THE LIKE
Filed April 2, 1947
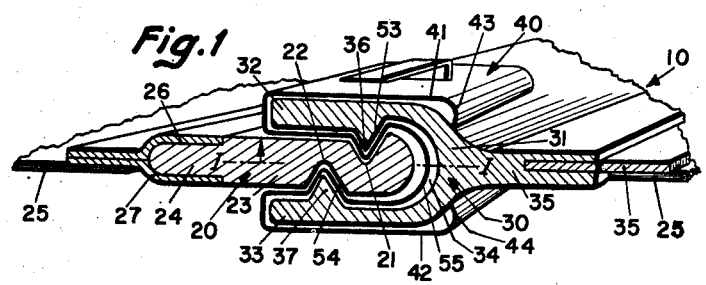
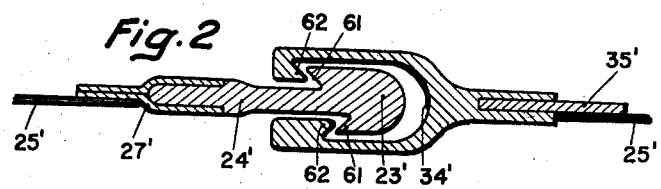
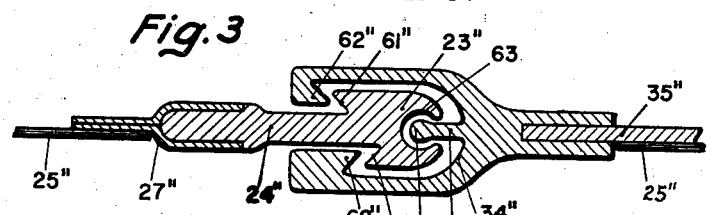
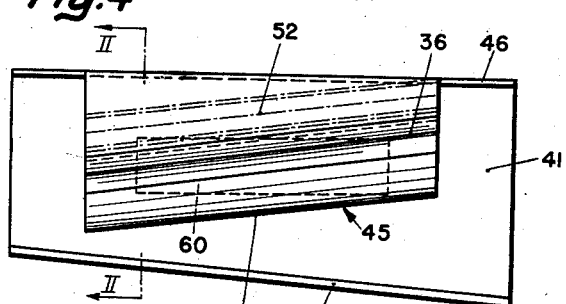
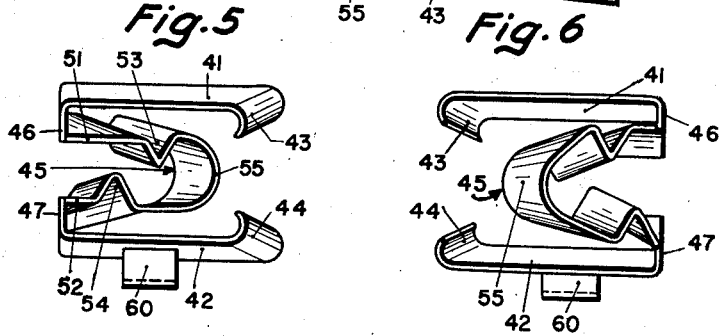

Patented Aug. 12, 1952

2,606,352

UNITED STATES PATENT OFFICE 2,606,352

FASTENING DEVICE FOR GARMENTS, SHOES, TENTS, AND THE LIKE

Hermann Wende, Zurich, Switzerland, assignor to Bernard E. Smith, New York, N. Y.

Application April 2, 1947, Serial No. 738,832
In Switzerland July 15, 1943

Section 1, Public Law 690, August 8, 1946
Patent expires July 15, 1963

2 Claims. (Cl. 24—201)

This invention relates to slide fasteners of the type employing a pair of complementary interengageable stringers, one having a socket extending along its forward edge and the other having an enlargement extending along its forward edge that is engageable in the socket of the first mentioned stringer, and a slider that embraces both the socket and enlargement of the respective stringers and is slidable therealong to effect interengagement and disengagement thereof. The invention relates particularly to the construction of the slider for engaging and disengaging the fastener stringers.

The principal objects of the invention are to provide an improved slider for this purpose that may be integrally formed from a single piece of sheet metal or the like, that will more securely and positively interengage the fastener stringers during the closing operation, and slide more smoothly along the stringers during both the opening and closing operations than the sliders heretofore proposed.

Fastening devices consisting of continuous edgeways arranged socket and rib members made of flexible material, and adapted to be interlocked by the rib member being inserted into the socket either by hand or by means of a slider, are well-known. However, such fastening devices as heretofore constructed have had insufficient holding strength for certain closure arrangements.

For the purpose of securing increased resistance to transverse tensional stress for such fastening devices, the coupling socket and rib, as herein disclosed, are respectively equipped with longitudinal, parallel, laterally spaced interlocking grooves and tongues, the cross sections of which may be triangular, semicircular, or dovetail-shaped.

A fastening device such as this will resist heavier transverse tensional stress regardless of whether the longitudinal grooves are provided inside the socket member or in the rib member of the fastening device.

This construction of the stringers, moreover, provides a means of enhancing the resistance of the coupled fastening device to any purposeful attempt to uncouple the said device without moving the slider, and affords a higher degree of imperviousness to water, inasmuch as the grooves and tongues, parallel with the longitudinal edges of the fastening device, may be disposed in laterally offset relationship to provide maximum rigidity.

A further form of construction, intended for fastening e. g. sheets of heavy canvas for tents, and with a view to securing a relatively higher degree of imperviousness to gases, includes a further groove on the outer edge of the rib member, and a corresponding tongue inside the socket member adapted to be inserted into the groove in the outer edge of the rib member.

Coupling and uncoupling of the rib and socket members of fastening devices of the class referred to by the present invention has to be done by means of a slider.

Whereas the commonly known type of such sliders consists of two plates connected with one another by means of a wedge-shaped open sleeve, the slider used in connection with the present invention is constructed in such a manner that its plates diverge both lengthwise and in height, while a wedge-shaped unilaterally open sleeve which connects the plates has channels severally corresponding to the longitudinal grooves and tongues, and running between the grooves and tongues, parallel to the walls of the wedge-shaped sleeve. These channels collectively diverge in the opposite direction, and at a rate greater than that of the longitudinal divergence of the plates.

Moreover, the wedge-shaped sleeve carrying the channels may be shorter than the plates, so as to provide, on both ends of the slider, an extension of the guideway formed by the plates and controlling the coupling of the two members of the fastening device by means of the slider.

Furthermore, the rib or bead member of the fastening device may be tongued on its off side and capped with a strip of cloth suitably fastened by means of paste, and disposed so as to allow for a margin of said strip of cloth to be sewn to the article that is to be equipped with said member of the fastening device.

Alternatively, the socket member of the fastening device may be provided with a slot-shaped rabbet for the purpose of holding a strip of cloth suitably fastened inside by means of paste, and disposed so as to allow for a margin of said strip of cloth to be similarly sewn together with the corresponding part of the article that is to be equipped with said member of the fastening device.

It is therefore an object of the present invention to provide an improved separable slide fastener of flexible material having greatly increased resistance to transverse separating stresses exerted on the cooperating interlocked members.

Another object is to provide such a fastener having its separable elements formed with improved means for securement to the material surrounding the opening to be closed by the fastener.

These and other objects, advantages and novel features of the invention will be apparent from the following description and the accompanying drawing. In the drawing:

Fig. 1 is a transverse sectional view of one form of separable slide fastener embodying the invention, with the section of the slider being taken on line II—II of Fig. 4.

Fig. 2 is a transverse sectional view of a modified form of separable slide fastener, according to the invention, with the operating slider omitted.

Fig. 3 is a view, similar to Fig. 2, of a further modified form of separable slide fastener construction according to the invention.

Fig. 4 is a longitudinal sectional view of the slider on the line I—I of Fig. 1.

Figs. 5 and 6 are opposite and elevational views of the slider.

Referring to Figs. 1, 4, 5 and 6, the illustrated embodiment of the invention includes a separable slide fastener 10 having a pair of separable elements 20 and 30 and a cooperating slider 40. Elements 20, 30 are of suitable flexible material such as natural rubber, modified natural rubber, artificial rubber, or plastic composition material. Slider 40 is of relatively stiff or rigid material, for example, metal or a hard plastic composition material.

Element 20 is formed with laterally spaced, parallel, longitudinally extending grooves 21, 22 on opposite sides of a thickened portion or rib 23. A reduced portion or tongue 24 extends outwardly from rib 23, and strips of fabric 26, 27 are pasted, glued, cemented, or the like to the opposed surfaces of tongue 24. These strips are sewn or cemented to each other and to the material 25 of the garment, tent, or the like having the opening closed by fastener 10.

Element 30 has an enlarged portion 31 with parallel, spaced walls 32, 33 forming a socket 34 receiving rib 23. Walls 32, 33 each have a rib 36, 37, extending longitudinally thereof, and aligned, in the juxtaposed position of elements 20, 30, with grooves 21, 22, respectively, of element 20. The cross-section of the laterally spaced, alternate ribs 36, 37 conforms to that of grooves 21, 22. A reduced portion, or tongue, 35 extends outwardly from socket 34 and has a longitudinal recess or rabbet along its edge in which is glued, pasted, or cemented a fabric strip 38 which may be sewn to material 25.

The slider 40 operates along elements 20 and 30 to engage rib 23 in socket 34 and disengage it therefrom. Slider 40 is preferably a one-piece member of sheet material and includes longitudinally divergent outer walls 41, 42 engaging the outer surfaces of walls 32, 33 of socket 34. The outer edges of walls 41, 42 are curved inwardly as at 43, 44 to ride along the inner edge of enlarged part 31. The inner edges of walls 41, 42 are joined by perpendicular flanges 46, 47 to an inner, open-sided sleeve 45.

Sleeve 45 includes diverging walls 51, 52, formed with ribs 53, 54, respectively, and having their inner edges joined by transversely arcuate wall 55. Ribs 53, 54 are shaped to conform to grooves 21, 22 and ribs 36, 37, and walls 51, 52 have surface engagement with rib 23 and the inner surfaces of socket walls 32, 33.

It will be noted that sleeve ribs 53, 54, and wall 55, extend diagonally relative to the longitudinal edges of elements 20, 30. Likewise, while flanges 46, 47 are parallel to the edges of elements 20, 30, intermediate edges 43, 44 are diagonal with respect thereto, and diverge relative to wall 55. The effect of these angular relationships is that slider 40, when pulled in one direction along elements 20, 30, draws rib 23 into socket 34 and aligns grooves 21, 22 with ribs 36, 37, the divergent walls 51, 52 clamping socket walls 32, 33 against rib 23. When slider 40 is moved in the opposite direction, diverging walls 51, 52 spread socket walls 32, 33 and arcuate wall 55 forces rib 23 out of socket 34, thus separating elements 20, 30.

Wall 42 of slider 40 is formed with a bracket 60 which may receive a suitable link for drawing slider 40 along fastener 10.

In the embodiment of Fig. 2, corresponding parts have been given like reference characters primed. Referring to Fig. 2, enlargement 23' is formed with a pair of rearwardly directed, longitudinal ribs 61. These ribs are staggered transversely of the enlargement. Socket 34' is formed with rearwardly opening, longitudinal recesses or grooves 62. Grooves 62 are transversely offset or staggered to align with ribs 61. Interfitting of ribs 61 and recesses 62 effectively closes the fastener, and the described construction is highly resistant to transverse separation stresses.

The embodiment of Fig. 3 is substantially the same as that of Fig. 2, and the same reference characters, double primed, have been used for like or corresponding parts. Fig. 3 differs from Fig. 2 in that enlargement 23" is formed with a forwardly opening socket 63 which receives a bulbous tongue 64 with a thickened extremity 66. This construction provides a substantially gas impervious closure.

The invention thus provides an easily operated flexible fastener which is effectively closed by operation of a slider to form an impervious closure. The combination is simple in operation, effective and of long life.

While specific embodiments of the invention have been shown and described in detail to illustrate the application of the principles thereof, it will be understood that the invention may be otherwise embodied without departing from such principles.

I claim:

1. For use with a flexible fastener comprising a pair of interengageable stringers, one of which has a socket extending along its forward edge and the other of which has an enlargement along its forward edge engageable in the socket, the opposite walls of the socket having ribs extending along their inner surfaces and engageable in mating grooves extending along the opposite surfaces of the enlargement; a slider for effecting engagement and disengagement of said stringers and consisting of an integral member engageable with and movable along the stringers, said member having an inner channel embracing the enlargement and an outer channel integral with and reversed relative to the inner channel and embracing the socket; the channels having common longitudinal offsets engaging the socket ribs and enlargement grooves; the legs of the inner channel being substantially parallel to those of said outer channel and said channels tapering in depth and width from one end thereof toward the other end.

2. For use with a flexible fastener comprising a pair of interengageable stringers, one of which has a socket extending along its forward edge and the other of which has an enlargement along its forward edge engageable in the socket, the opposite walls of the socket having ribs extending along their inner surfaces and engageable in mating grooves extending along the opposite surfaces of the enlargement; a slider for effecting engagement and disengagement of said stringers and consisting of an integral member engageable with and movable along the stringers, said member having an inner channel embracing the enlargement and an outer channel integral with and reversed relative to the inner channel and embracing the socket; the channels having common longitudinal offsets engaging the socket ribs and enlargement grooves.

HERMANN WENDE.

REFERENCES CITED

The following references are of record in the file of this patent:

UNITED STATES PATENTS

| Number | Name | Date |
| --- | --- | --- |
| 1,734,479 | Glidden | Nov. 5, 1929 |

FOREIGN PATENTS

| Number | Country | Date |
| --- | --- | --- |
| 200,985 | Switzerland | Mar. 1, 1939 |
| 375,235 | Italy | Sept. 28, 1939 |